United States Patent
Papadatos

[19]

[11] Patent Number: 6,102,357
[45] Date of Patent: Aug. 15, 2000

[54] MULTI-POSITIONAL TREE STAND

[76] Inventor: Evangelos A. Papadatos, 4102 Olympic Way, Alexandria, Va. 22312-1118

[21] Appl. No.: 09/250,807

[22] Filed: Feb. 17, 1999

Related U.S. Application Data

[60] Provisional application No. 60/075,021, Feb. 18, 1998.
[51] Int. Cl.[7] .................................................. F16M 13/00
[52] U.S. Cl. ........................ 248/519; 248/516; 47/40.5
[58] Field of Search ................................ 248/519, 511, 248/516, 521, 523, 524, 527, 528, 529, 436, 439, 170; 47/40.5; 403/114, 112, 128, 131

[56] References Cited

U.S. PATENT DOCUMENTS

| 2,746,700 | 5/1956  | Barbera    | 248/516 |
|-----------|---------|------------|---------|
| 2,893,668 | 7/1959  | Applegate  | 248/516 |
| 2,997,264 | 8/1961  | Zelenitz   | 248/516 |
| 3,211,405 | 10/1965 | Fey et al. | 248/183 |
| 3,267,886 | 8/1966  | Glass      | 108/127 |
| 3,309,049 | 3/1967  | Albee, Jr. | 248/171 |
| 3,315,930 | 4/1967  | Cota       | 248/171 |
| 3,779,493 | 12/1973 | Gidlof     | 248/516 |
| 4,156,323 | 5/1979  | Scheffler  | 47/40.5 |
| 4,571,882 | 2/1986  | Capen      | 47/40.5 |
| 5,002,252 | 3/1991  | Setala et al. | 248/533 |
| 5,492,301 | 2/1996  | Hauser     | 248/516 |
| 5,510,863 | 4/1996  | Kliewer    | 354/81  |
| 5,564,661 | 10/1996 | Gershon    | 248/167 |
| 5,576,722 | 11/1996 | Bustillos  | 343/882 |

FOREIGN PATENT DOCUMENTS

| 598561 | 12/1925 | France . |
| 384878 | 11/1923 | Germany . |

*Primary Examiner*—Anita M. King
*Attorney, Agent, or Firm*—Richard C. Litman

[57] ABSTRACT

A versatile and adjustable stand having a base, a receptacle attached to the base via a ball and socket joint, and a plurality of horizontally and vertically adjustable legs. The stand also includes a locking device which fixes the angular position of the ball portion of the ball and socket joint, and various spring biasing mechanisms which allow for vertical and horizontal adjustability of the legs.

6 Claims, 7 Drawing Sheets

MULTI-POSITIONAL TREE STAND

CROSS-REFERENCE TO RELATED APPLICATION

This application claims the benefit of U.S. Provisional Patent Application Serial No. 60/075,021, filed Feb. 18, 1998.

BACKGROUND OF THE INVENTION

1. Field of the Invention

The present invention generally relates to a device for rotatably securing an object in a generally vertical orientation, and, more specifically, an omnidirectionally adjustable receptacle for receiving and securing an object, such as a Christmas tree trunk, in a vertical orientation.

2. Description of Related Art

Tripods and support stands are well known in the prior art. Of particular relevance is U.S. Pat. No. 5,510,863, issued Apr. 23, 1996 to Waldemar Kliewer, that teaches a head piece for mounting a camera, or the like. The head piece is swivel-mounted to a tripod by a ball or swivel axis joint. Additionally, U.S Pat. No. 3,211,405, issued Oct. 12, 1965 to Alfred Fey et al. shows a support for photographic instruments which includes an adjustable, rotational spherical member. However, such a stand is not suited for adaptation to intended use of the present invention, namely as a Christmas tree stand.

Other patents which may be relevant and illustrative of supports having omnidirectional adjustment mechanisms are U.S. Pat. No. 3,267,886, issued Aug. 23, 1964 to H. P. Glass, (Leg Mounting Means For Furniture); U.S. Pat. No. 3,309,049, issued Mar. 14, 1967 to P. F. Albee, Jr. (Stand For Projection Screen); U.S. Pat. No. 3,315,930, issued Apr. 25, 1967 to Glenn L. Cota (Portable Projection Screen Stand); U.S. Pat. No. 5,564,661, issued Oct. 15, 1996 to Monty B. Gershon (Lectern or Stand Primarily For Musicians); DE Pat. No 384,878, published Nov. 6, 1923; and FR Pat. No. 598,561, published Dec. 19, 1925.

However, none of the above inventions and patents, taker either singly or in combination, is seen to describe the instant invention as claimed.

SUMMARY OF THE INVENTION

Accordingly, it is a principal object of the invention to provide an apparatus which rotatably secures a workpiece in a generally vertical orientation. The present invention is directed to a stand that satisfies a need for holding a workpiece or object in a generally vertical orientation and thereupon permits omnidirectional adjustment of such object. The stand comprises a base having two sides, a receptacle for holding the workpiece, and a plurality of omnidirectional adjustment mechanisms, including a ball and socket joint pivotally connecting the receptacle to the base and adjustable legs.

It is another object to provide an apparatus which is omnidirectionally adjustable.

A further object of the apparatus is to be suitable for use as a tree stand.

The ball and socket joint is restrained to pivot about a predetermined range, maintaining the receptacle in a generally vertical orientation relative to the base. The ball and socket joint comprises a socket portion, a ball portion, and a shaft attached to the ball portion and the receptacle which may be tubular. The socket portion is attached to the base and the ball portion rotatably sits within the socket portion.

The stand also comprises a locking plate disposed between the receptacle and the ball portion, wherein the locking plate is connected to the base by a plurality of posts and wherein a plurality of coils axially surround each post, each coil being sandwiched between the locking plate and the base. At least one of the coils adjustably move about the post such that, when the coil is compressed, the locking plate exerts pressure on the ball portion thereby restricting the ball portion's movement within the socket portion.

The stand also includes a plurality of legs, preferably three legs, attached to the base at the side opposite the receptacle. The legs includes a support attached to and adjoining the base. The support in turn includes a catch end having a catch. Also, at least two of the supports are pivotally attached to the base.

The legs further include a channel portion hingedly attached to the catch end. The channel portion includes a pair of opposing side walls, an upper wall and a lower wall attached to the side walls, thus forming the channel. Both the upper wall and the lower wall includes a hole linearly aligned to the channel. A rod disposed is positioned within the holes of the upper wall and the lower wall. The rod includes a first end, a second end and a tab protruding from the rod near the second end.

A spring is disposed around the rod near the second end, wherein the spring is positioned between the tab and the lower wall. The spring biases the first end of the rod towards the catch of the supports.

The stand further comprises a locking member attached to the base on the same side the legs are attached to the base. The locking member includes a pair of grooves. The stand also has a pair of levers connected to one of the support at a fulcrum point, wherein each of the levers includes a tongue. A coil spring is positioned about the fulcrum points, wherein the coil springs biases each of the levers towards one of the grooves.

The multi-positional stand of the present invention makes it possible to erect a Christmas tree with a crooked or bent base into an upright position without the Christmas tilting or leaning to one side. The base of the Christmas tree is simply inserted into the receptacle portion of the stand and the angle of the receptacle relative to the base is adjusted until the Christmas tree is completely vertical.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
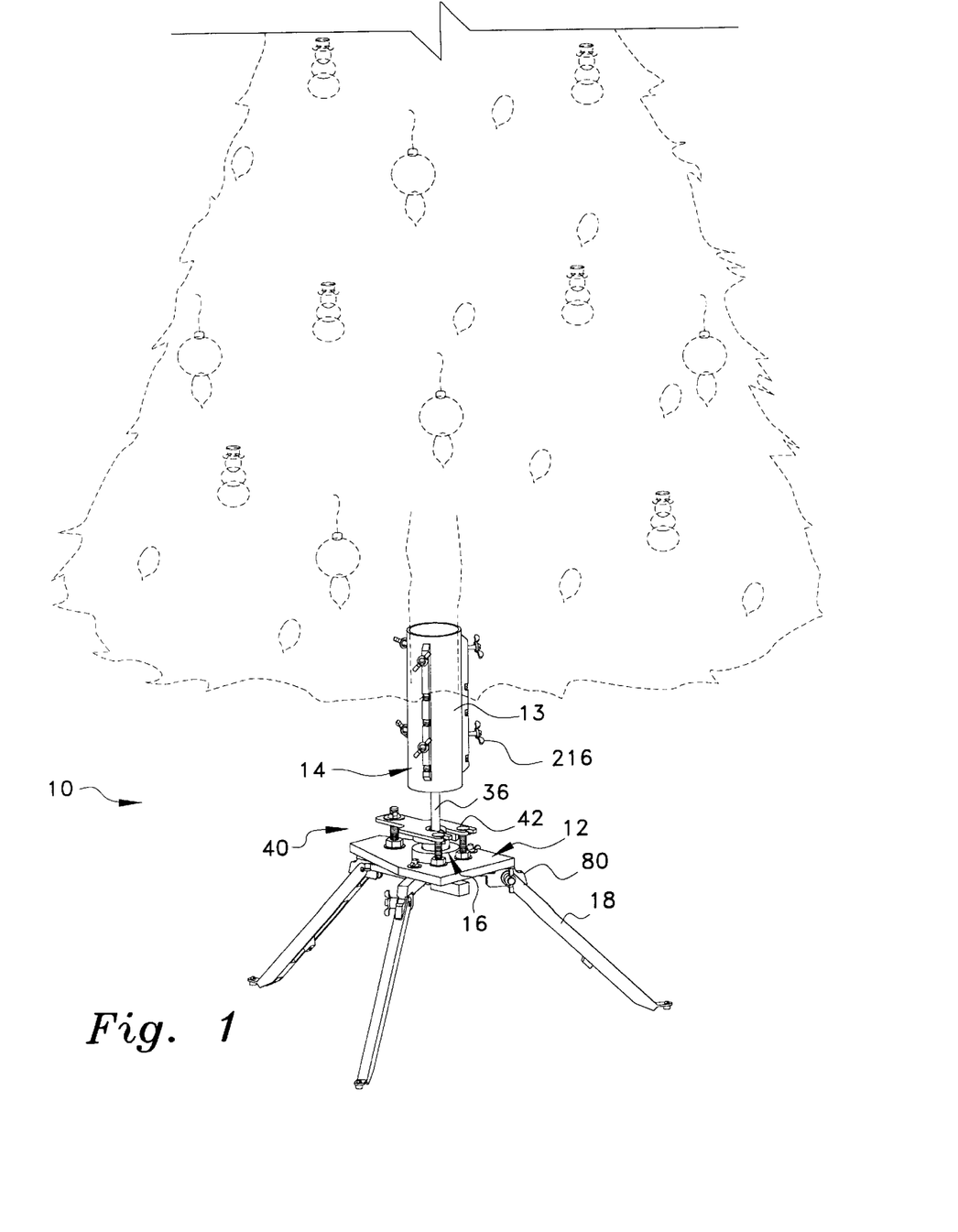
FIG. 1 is an environmental view of an embodiment of the present invention holding a Christmas tree.

Referring generally to FIG. 1, the present invention, hereinafter referred to as a stand 10, comprises a base assembly 12 including a plurality of legs 18 adjustable by various adjustment mechanisms, a ball and socket joint assembly 16 connected to the base 12 and oriented upwardly, and a receptacle assembly 14 connected to the ball and socket joint assembly 16 for holding a workpiece. In FIG. 1 the workpiece shown is a Christmas tree. The stand 10 permits omnidirectional adjustment of the workpiece.

Figure 5:
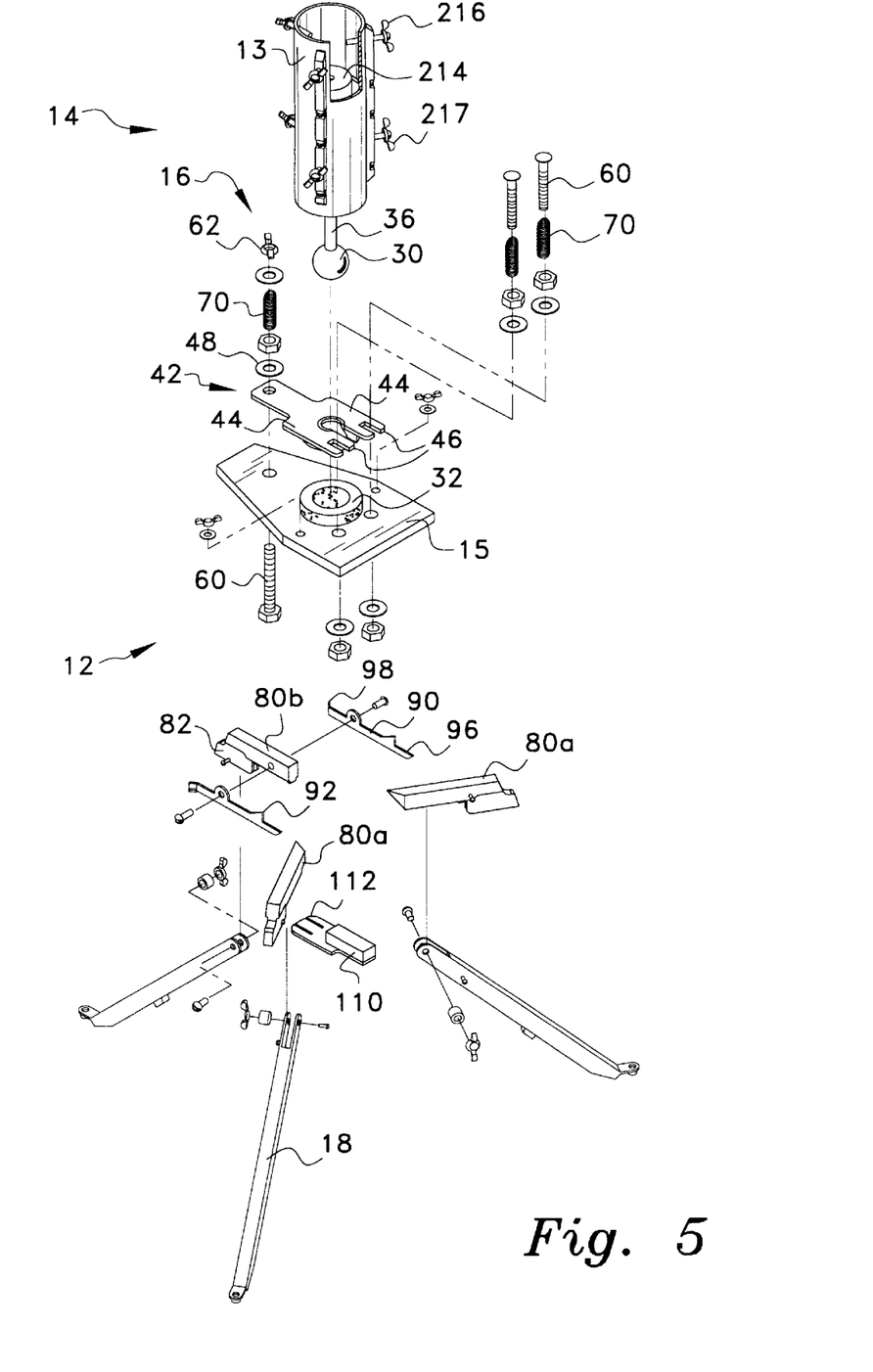
FIG. 5 is an exploded view of the embodiment of FIG. 1.

Referring to FIG. 5, the component parts of the stand 10 are detailed. The base 12 includes a base plate 15 supported by legs 18 attached to a lower side of the base plate 15. The ball and socket joint assembly 16 has a ball portion 30, a socket portion 32 and a shaft 36. The socket portion 32 is attached to base plate 15 on its upper side. The ball portion 30 seats in and is rotatable within the socket portion 32. The shaft 36 has a first end connected to the ball portion 30 and a second end connected to the receptacle assembly 14.

Figure 2:
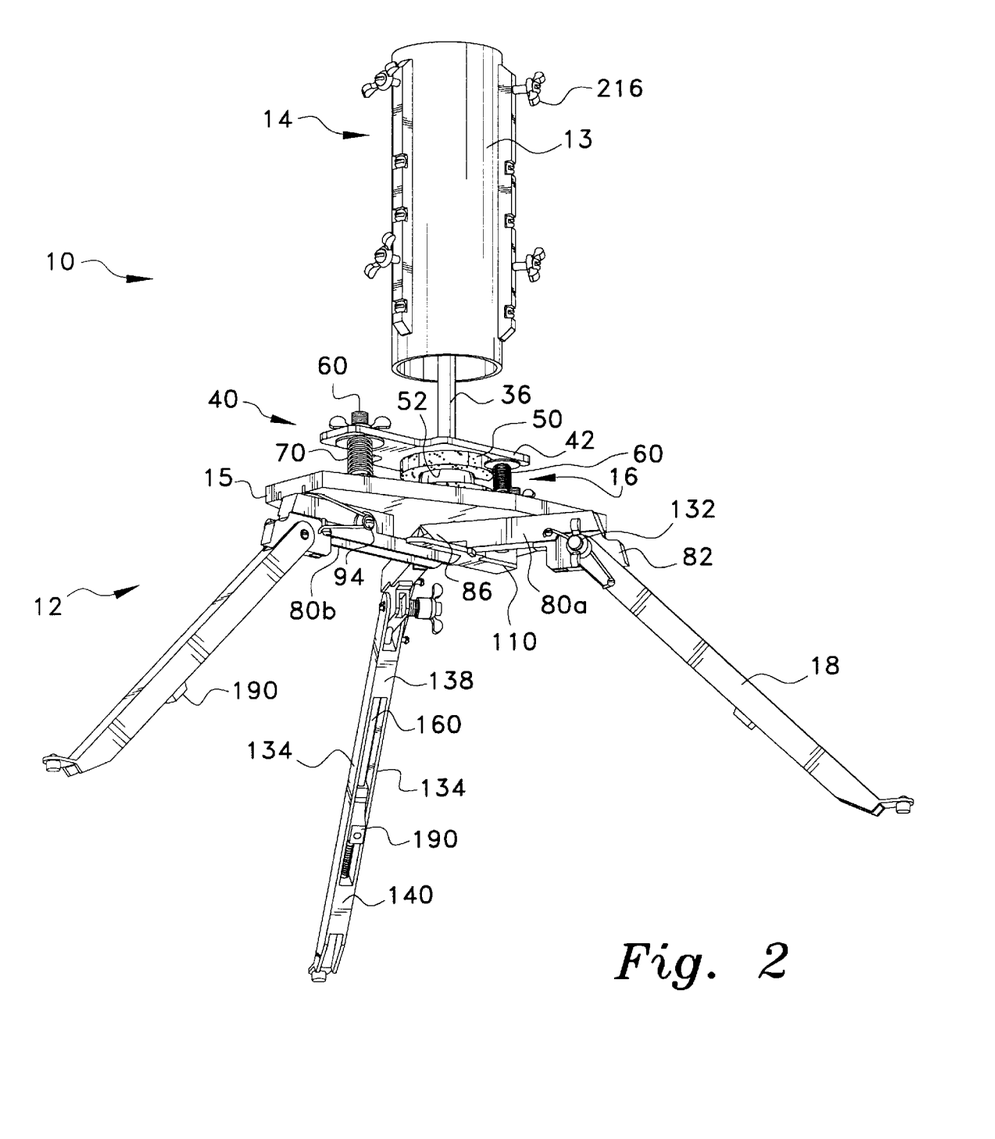
FIG. 2 is a perspective view of the embodiment of FIG. 1.
Figure 3:
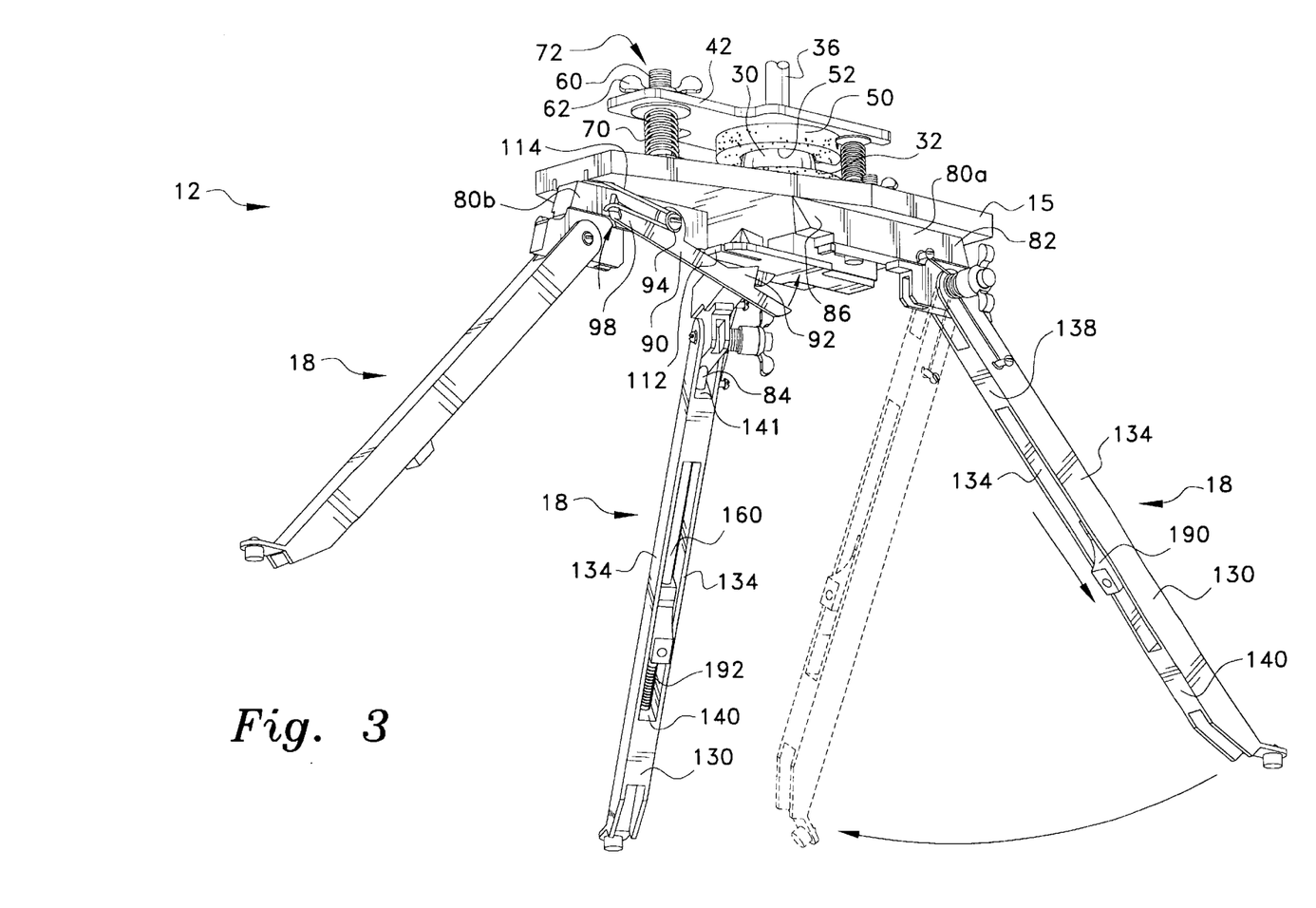
FIG. 3 is a perspective view of the legs of the embodiment of FIG. 1.

Referring primarily to FIGS. 2 and 5, the stand 10 is shown to have a locking device 40 (FIG. 2) which secures the ball and socket joint assembly 16 in a fixed position. The locking device 40 includes a locking plate 42 having an aperture permitting passage of the shaft 36. As shown in FIG. 3, a holding member 50 is attached to the underside of locking plate 42 and interfaces with the ball portion 30 near the point where the shaft 36 is connected to the ball portion 30. The holding member 50 has an aperture 52 through which the shaft 36 passes, wherein its annular configuration causes the holding member 50 to act as a collar of the ball while the locking plate is held tight.

The plate 42 is further supported above the ball and socket joint 16 by a plurality of posts 60. A plurality of coils 70 are wrapped around each of the posts 60. Further, the coils 70 are sandwiched between the base plate 15 and the locking plate 42 by securing the posts to the locking plate as described below.

As best seen in FIG. 5, it is preferred that the locking plate 42 is planar and generally Y-shaped, having three prongs 44, two of which form a bifurcated portion 46. Each of the posts 60 is positioned in order to contact one of the three prongs 44. The prong 44 opposite the bifurcated portion 46 has an opening 48 through which one of the posts 60 is inserted. The two coils 70 and associated posts 60 are positioned proximate the bifurcated portion 46, and fix the base plate 15 and locking plate 42 at a predetermined maximum spacing, yet allow downward movement by virtue of the compressibility of the two coils 70.

The remaining coil 70 and post 60 assembly is adjustable along the axis of the post 60 in each direction, and is hereinafter referred to as the adjustable coil 72 (see FIG. 3) This is preferably accomplished by having the post 60 be a male threaded bolt and by having a nut 62 mate with the end of the post 60 distal of the locking plate 42, which nut when tightened upon the locking plate results in pressure being exerted upon the holding member 50 and in turn ball portion 30. By loosening the nut 62, the adjustable coil 72 decompresses, which urges the holding member 50 to disengage from the ball portion 30, thus allowing the ball portion 30 to move about the socket portion 32.

As a result, the receptacle 14 may be rotated axially or be adjusted to a desired angle relative to the base 12 when loose. By tightening the nut 62, the adjustable coil 72 compresses, which urges the holding member 50 to engage the ball portion 30, thus fixing the ball portion 30 within the socket portion 32. Therefore, the receptacle assembly 14 is also held in place.

Figure 6:
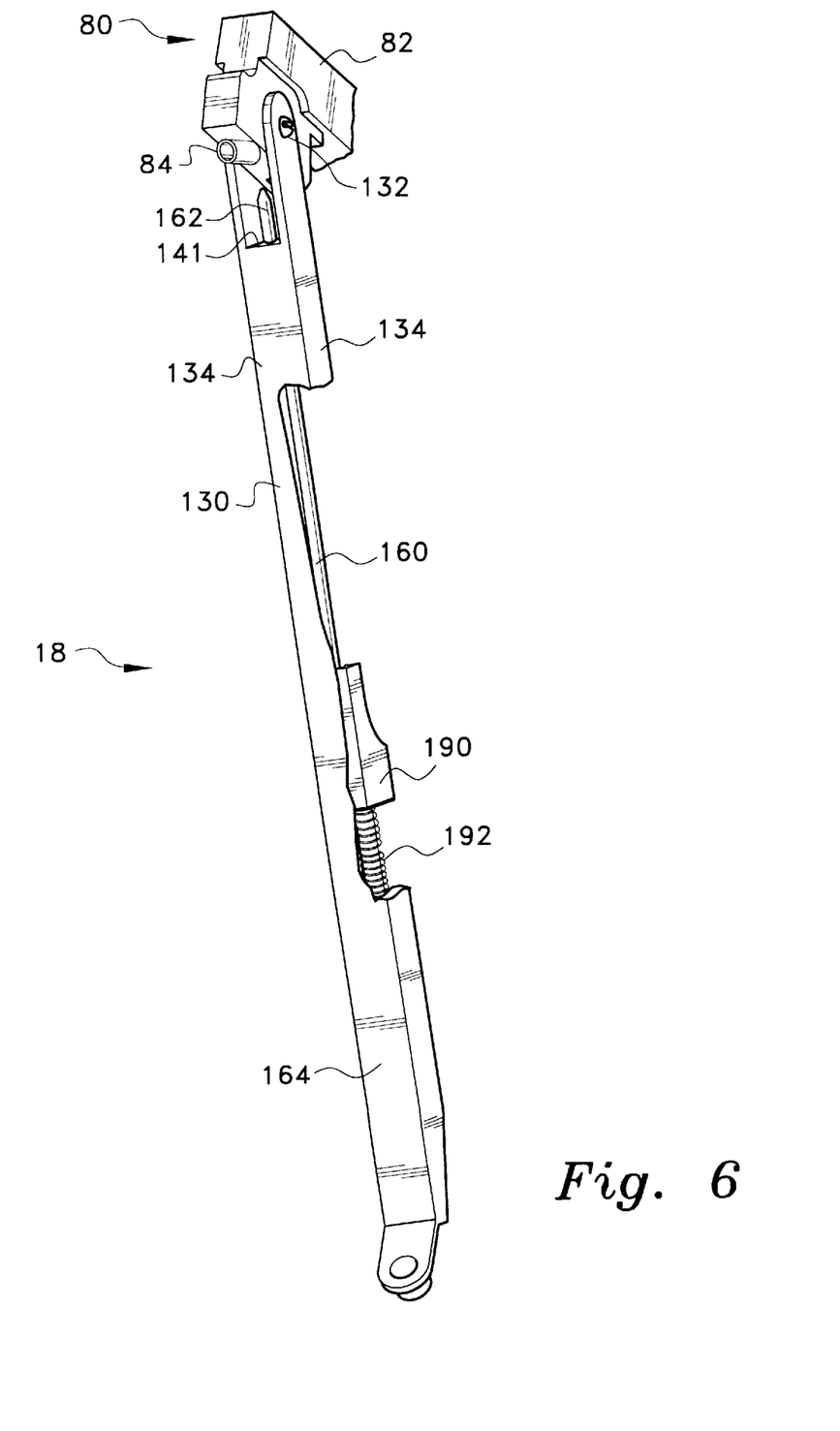
FIG. 6 is a perspective cutaway view of a leg of the embodiment of FIG. 1.

Referring now to FIGS. 3 and 6, each leg 18 is attached to a support 80 (FIG. 6) in turn attached to and adjoining the base plate 15. It is preferred that at least two of the supports are rotatably attached to the base plate 15, hereinafter referred to as rotatable support 80*a*, while the support 80 which is fixed is hereinafter referred to as the fixed support 80*b*. Each support 80 includes a catch end 82, which has a catch 84, and a locking end 86.

With further reference to FIG. 6, each leg 18 also includes a channelled portion 130 attached to the catch end 82 by a hinge pin 132. The channelled portion 130 includes a pair of opposing side walls 134. An upper wall 138 (FIG. 3), proximate to the catch end 82, and a lower wall 140 (FIG. 3) are connected to each of the opposing side walls 134, as seen in FIG. 3. The side walls 134 and the upper wall 138 and the lower wall 140 are connected to form a channel. The channel at each end is blocked by an end wall 141, including an aperture through which a rod 160 is slidably positioned. The rod 160 includes a first end 162, a second end 164 and a tab 190 attached to the rod 160. In the use position, the first end 162 is in registry with the catch 84, thereby locking the channel portion 130 in a fixed and erect position.

The rod 160 rests within the channel with the tab 190 positioned medially along the channel, and located near the second end 164. A spring 192 is positioned around the rod 160, and is slightly compressed between the lower wall 140 and the tab 190. Since the lower wall 140 is in a fixed position, the spring 192 urges the tab 190 away from the lower wall 140. Therefore, the tab 190, and thus the first end 162, are urged away from the lower wall 140 in order to cause the first end 162 to remain engaged with the catch 84.

Figure 4:
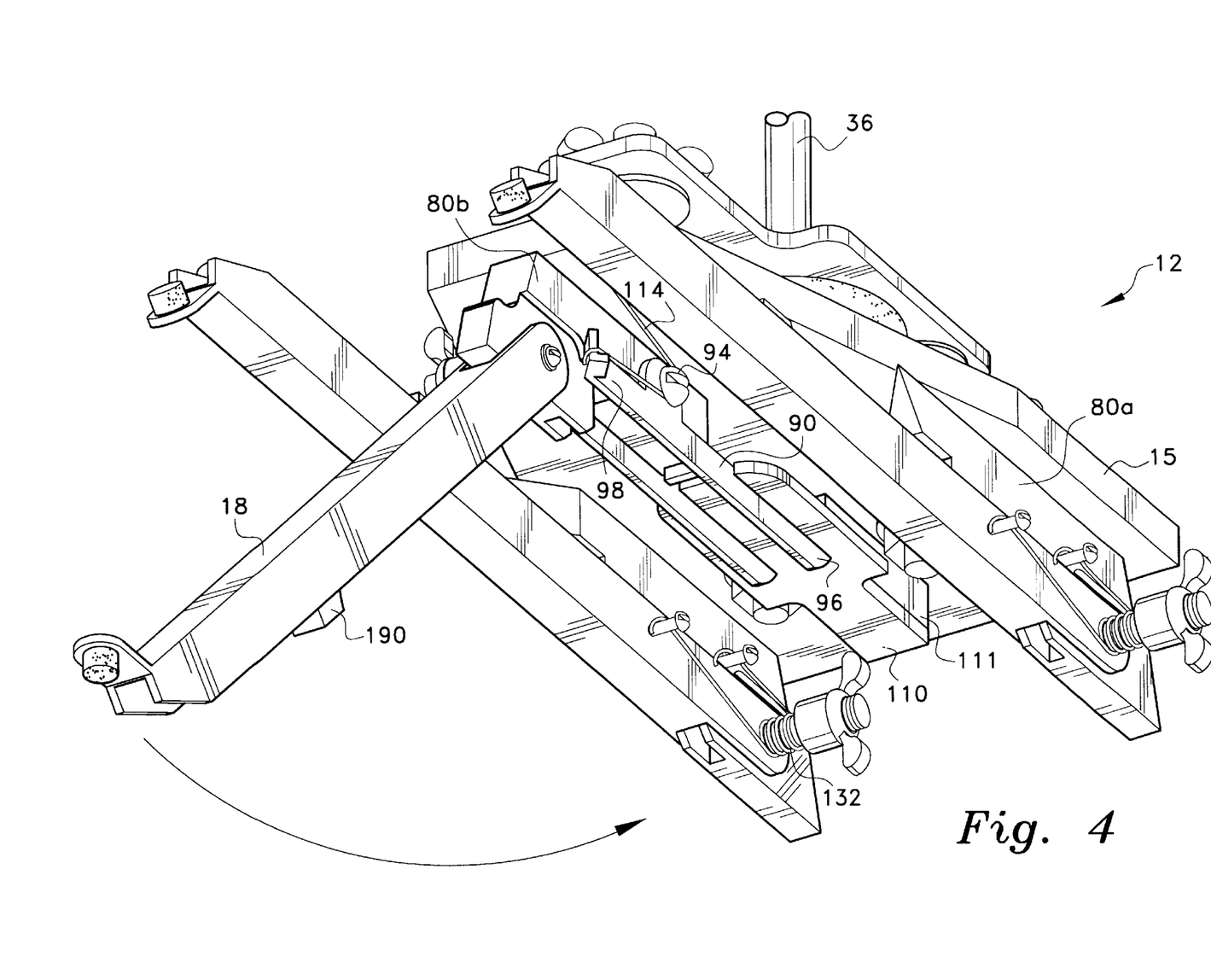
FIG. 4 is a bottom view of the legs of the embodiment of FIG. 1.

To appreciate the positions which the legs 18 may achieve, and referring now to FIG. 4, the stand is shown with two legs 18 having the rotatable supports 80*a* in the storage position and the leg 18 having the fixed support 80*b* in the use position. The arrow illustrates the movement of a leg 18 from the use position to the storage position.

In order to switch from the use position to the storage position, and vice versa (as best seen in FIGS. 4 and 6), the tab 190 is urged to move in the direction towards the second end 164. Thus, if the legs 18 are in the use position, the first end 162 is brought out of registry with the catch end 82, thereby allowing the channel portion 130 to rotate about the hinge pin 132. If the legs 18 are in the storage position, the first end 162 is lined up with the catch end 82, and the tab 190 is released to bring the first end 162 into registry with the catch end 82.

Referring to FIG. 3 and 4, the base assembly 12 further comprises a locking member 110 attached to the side of the base plate 15 to which the legs 18 are attached. The locking member 110 comprises a body 111 and a pair of grooves 112 (see FIG. 5), preferably extending from the body 111. It is preferred that the locking member 110 is positioned between the rotatable supports 80*a* with the grooves 112 facing the fixed support 80*b*.

A pair of opposing levers 90 are rotatably attached to the fixed support 80*b* about a fulcrum pin 94. Each of the levers 90 includes a proximate end 96, which is most proximate to the grooves 112, a distal end 98, and a tongue 92 located near the proximate end 96. The tongues 92 are positioned to be brought into registry with each of the grooves 112.

A pair of coil springs 114 are provided, each pair of which wraps around one fulcrum pin 94. One of the ends of the coil spring 114 is connected to the base plate 15 and the other end of the coil spring 114 is connected to the distal end 98 of the lever 90. The coil spring 114 is arranged so as to urge the tongues 92 into their respective grooves 112.

In the use position, the tongues 92 are in registry with the grooves 112. Also, the tongues 92 hold the rotatable supports 80a in a fixed position. This is accomplished by sandwiching the locking end 86 of the rotatable support 80a between one of the tongues 92 and the locking member 110. Referring to FIG. 3, one of the levers 90 is shown with the distal end 98 depressed, which in turn brings the tongue 92 out of registry with the groove 112. This frees the locking end 86, thus allowing the rotatable support 80a to rotate.

Figure 7:
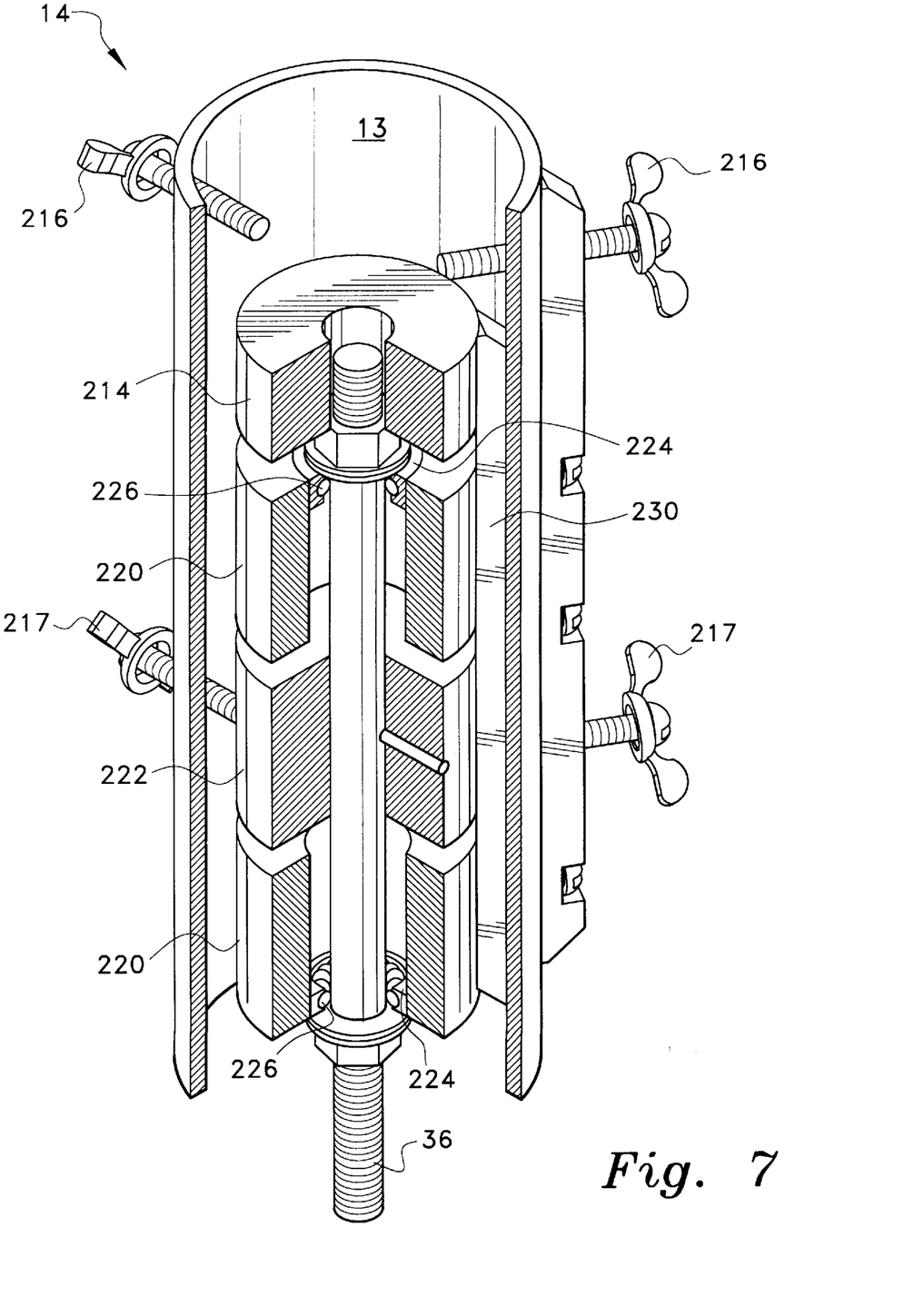
FIG. 7 is a perspective cutaway view of the receptacle of the embodiment of FIG. 1.

Referring to FIG. 7, the receptacle assembly 14 is shown to include a tube 13, generally cylindrical in shape. The tube 13 includes a floor 214, defining a cavity in which the workpiece may rest.

In the preferred embodiment, the receptacle assembly 14 includes a pair of drums 220 and a brake 222 axially positioned around the shaft 36 below the floor 214. The drums 220 and brake 222 are preferably circular in shape. The brake 222 is positioned between the pair of drums 220 and is connected to the shaft 36. The floor 214 and drums 220 are fixedly attached to the interior surface of the tube 13.

Each of the pair of drums 220 includes a circular race 224 wrapped around the shaft 36. Each of the races 224 include a plurality of ball bearings 226. Thus, the shaft 36 may freely rotate within the drums 220. Additionally, a plurality of beams 230 (of which one is shown) are attached to the floor 214 and the pair of drums 220. The beams 230 keeps the floor 214 and the drums 220 in a fixed position relative to each other. Thus, as with the drums 220, the shaft 36 may freely rotate within the floor 214.

The tube 13 includes a plurality of threaded holes and a plurality of screws 216 and 217, matingly threaded therethrough. The end of each screw 216 passes into the cavity and abuts against the workpiece, thereby securing the workpiece within the receptacle 14. The ends of the screws 217 pass into the cavity and abut against the brake 222, thereby preventing the shaft 36 from rotating, as described above.

Some variations within the scope of the invention are as follows. Referencing FIG. 2 and 5, the locking device 40 may exclude the coils 70, while the bifurcation portion 46 of the locking plate 42 may be hingedly attached to the posts 60, and the remaining prong 44 may be removably attachable to its post 60. Also, the legs 18 may be excluded, and replaced by an attachment device which allows the base 15 to attach to some other item, such as a wall. Additionally, the receptacle 14 may be any geometric shape in cross section.

The preferred embodiments of the present invention disclosed herein are intended to be illustrative only and are not intended to limit the scope of the invention. It should be understood by those skilled in the art that various modifications and adaptations of the present invention as well as alternative embodiments of the present invention may be contemplated. It is to be understood that the present invention is not limited to the embodiments described above, but encompasses any and all embodiments within the scope of the following claims.

I claim:

1. A stand for holding a workpiece comprising:
   a base having two sides;
   a receptacle for holding the workpiece; and
   a ball and socket joint including;
   a socket portion attached to one side of said base;
   a ball portion rotatably seated within said socket portion;
   a shaft attached to said ball portion and connected to said receptacle, thereby rotatably connecting said receptacle to said base; and
   a locking device which locks said ball and socket joint in a fixed position, said locking device includes;
   a plurality of posts attached to said base at the side in which said ball and socket point is attached;
   a plurality of coils wrapped around each of said posts;
   a locking plate including openings, whereby said posts insert within said openings; and
   a holding member attached to said locking plate, wherein said holding member includes an aperture in which said shaft rotates, wherein said holding member removably meshes with said ball portion.

2. A stand according to claim 1, further comprising:
   a plurality of legs connected to the opposite side of said base in which said receptacle is connected, wherein said legs are longitudinally collapsible and at least one of said legs is latitudinally movable.

3. A stand according to claim 2, wherein there are three legs and said legs comprise:
   a support attached to said base, said support including a catch end and a locking end, wherein at least two of said supports are rotatable about a longitudinal axis and the remaining of said supports is fixed;
   a channel portion hingedly attached to said support at said catch end, said channel portion comprising;
   a pair of opposing side walls;
   an upper wall located near said support;
   a lower wall;
   wherein said upper wall and said lower wall are attached to each of said opposing side walls to form a channel;
   wherein said upper wall and said lower wall includes a hole linearly aligned with said channel;
   a rod positioned within each of said holes of said upper wall and said lower wall, said rod including a first end disposed proximate to said upper wall, a second end disposed proximate to said lower wall, and a tab disposed between said first end and said second end; and
   a spring wrapped around said rod, said spring being positioned between said tab and said lower wall, wherein said spring biases said first end towards said catch end.

4. A stand according to claim 3, further comprising:
   a locking member attached to said base, at the side where said legs are attached, wherein said locking member is positioned between said supports that are rotatable and said locking member includes;
   a body; and
   a pair of grooves extending from said body;
   a pair of opposing levers attached to said support that is fixed, wherein said levers may rotate, and wherein each of said levers include a proximate end proximate to said grooves, a distal end, and a tongue positioned proximate to said proximate end; and
   a coil spring attached to each of said levers and said fixed support, wherein said coil spring biases each of said tongues to be in registry with each of said respective grooves.

5. A stand for holding a workpiece comprising:
   a base having two sides;

a receptacle for holding the workpiece; and a ball and socket joint including;
- a socket portion attached to one side of said base;
- a ball portion rotatably seated within said socket portion;
- a shaft attached to said ball portion and connected to said receptacle, thereby rotatable connecting said receptacle to said base;

a floor attached to said receptacle at the interior of said receptacle, said floor being positioned around said shaft;

a pair of drums attached to said receptacle at the interior of said receptacle, said pair of drums being positioned around said shaft;

a pair of races, one of each of said races being attached to one each of said drums;

a plurality of ball bearings disposed within each of said races; and a brake attached to said shaft, said brake being positioned between said pair of drums;

whereby said shaft may freely rotate within said pair of drums and said floor, or may be prevented from rotating within said pair of drums and said floor.

6. A stand for holding a workpiece comprising:

a base having two sides;

a receptacle for holding the workpiece, said receptacle positioned on one of said sides of said base;

a ball and socket joint pivotally connecting said receptacle to said base, wherein said ball and socket joint is restrained to pivot about a predetermined range and said ball and socket joint includes;
- a socket portion;
- a ball portion; and
- a shaft attached to said ball portion and said receptacle;
  - wherein said socket portion is attached to said base and said ball portion is rotatably seated within said socket portion;

a locking plate, disposed between said receptacle and said ball portion, is connected to said base by a plurality of posts, and wherein a plurality of coils are disposed around said posts and are sandwiched between said locking plate and said base, wherein at least one of said coils adjustably moves about said post, whereby when said coil is compressed, said locking plate exerts pressure or said ball portion, thereby restricting said ball portion's movement within said socket portion;

three legs attached to said base at a surface opposite said receptacle, wherein each of said legs includes;
- a support attached to and adjoining said base, said support including a catch end having a catch, wherein said support is pivotally attached to said base;
- a channel portion hingedly attached to said catch end, wherein said channel portion includes;
  - a pair of opposing side walls;
  - an upper wall;
  - a lower wall;
    - wherein said upper wall and said lower wall are attached to said opposing side walls, thereby forming a channel;
    - wherein both said upper wall and said lower wall include a hole linearly aligned to said channel;
- a rod disposed within said holes of said upper wall and said lower wall, said rod includes a first end, a second end and a tab protruding from said rod near said second end;
- a spring disposed around said rod near said second end, wherein said spring is positioned between said tab and said lower wall;
- a locking member attached to said base on the same side said legs are attached to said base, wherein said locking member includes a pair of grooves;
- a pair of levers connected to said support at a fulcrum point, wherein each of said levers includes a tongue; and
- a pair of coils spring positioned about said fulcrum points wherein said coil springs bias of said levers towards one of said grooves.

* * * * *